United States Patent
Booton

(10) Patent No.: US 6,882,720 B2
(45) Date of Patent: Apr. 19, 2005

(54) COMPUTER TELEPHONY INTEGRATION

(75) Inventor: Laurence J Booton, Ipswich (GB)

(73) Assignee: British Telecommunications public limited company, London (GB)

( * ) Notice: Subject to any disclaimer, the term of this patent is extended or adjusted under 35 U.S.C. 154(b) by 129 days.

(21) Appl. No.: 10/221,212

(22) PCT Filed: Mar. 23, 2001

(86) PCT No.: PCT/GB01/01283

§ 371 (c)(1),
(2), (4) Date: Sep. 10, 2002

(87) PCT Pub. No.: WO01/76268

PCT Pub. Date: Oct. 11, 2001

(65) Prior Publication Data

US 2003/0043988 A1 Mar. 6, 2003

(30) Foreign Application Priority Data

Mar. 30, 2000 (EP) ............................................. 00302693

(51) Int. Cl.[7] ................................................ H04M 3/42
(52) U.S. Cl. ............................. 379/209.01; 379/220.01; 379/210.01
(58) Field of Search ....................... 379/209.01, 220.01, 379/210.01

(56) References Cited

U.S. PATENT DOCUMENTS 6,411,805 B1 * 6/2002 Becker et al. ............ 455/414.1
6,614,896 B1 * 9/2003 Rao ........................ 379/209.01

* cited by examiner

Primary Examiner—Ahmad F. Matar
Assistant Examiner—Rasha S. Al-Aubaidi
(74) Attorney, Agent, or Firm—Nixon & Vanderhye P.C.

(57) ABSTRACT

When a terminating call is forwarded by a CTI-enabled switch to an off-switch destination, the associated CTI controller is notified of the delivery of that call and in response the controller records that destination number as busy and invokes a call back when free request in respect of the destination number. When a notification is received at the CTI-enabled switch that the destination number has become free, the controller is notified, and in response records the destination number as free. The CTI-enabled switch may comprise a switch in combination with a telephony card.

18 Claims, 3 Drawing Sheets

COMPUTER TELEPHONY INTEGRATION

This application is the US national phase of international application PCT/GB011/01283 filed 23 Mar. 2001 which designated the U.S.

BACKGROUND

1. Technical Field

This invention relates to the use of a computer for controlling the operation of a telephony system, such use is known in the art as computer telephony integration (CTI), and the systems employing such control are known as CTI systems.

2. Description of Related Art

As a general background, the reader will find examples of such CTI systems disclosed in the articles "Introduction to Computer Telephony Integration", by A. Catchpole, G. Crook, and D. Chesterman, British Telecommunications Engineering, Vol. 14, July 1995; "Computer Telephony Integration—The Meridian Norstar", by A. Catchpole, British Telecommunications Engineering, Vol. 14, Oct. 1995; "Computer Telephony Integration—The Meridian 1 PBX", by P. Johnson, A. Catchpole, and L. Booton, British Telecommunications Engineering, Vol. 15, July 1996; "Callscape Computer Telephony Integration for the Small Business", by G. Hillson, G. Hardcastle, and M. Allington, British Telecommunications Engineering, Vol. 15, January 1997, and "Call Centres—Doing Business by Telephone" by M. Bonner, British Telecommunications Engineering, Vol. 13, July 1994.

BRIEF SUMMARY OF EXEMPLARY NON-LIMITING EMBODIMENTS

According to a first aspect of the present invention there is provided a method of operating a computer telephony integration (CTI) system comprising a CTI-enabled switching means, and an associated CTI controller coupled to the CTI-enabled switching means via a CTI signalling link, the method comprising the steps of:
responding to receipt of a call terminating at the CTI-enabled switching means by
delivering that terminating call to a destination network termination, and
sending to the CTI controller signalling data of that call comprising at least the directory number of that destination network termination;
notifying the CTI controller of an answer condition with respect to that destination network termination; and,
in response to that notification, sending from the CTI controller to the CTI-enabled switching means a command for invoking a call back when free facility in respect of that destination directory number.

Preferably, there are included the steps of:
further responding at the CTI controller to that notification of an answer condition by notifying the CTI controller of the receipt at the CTI-enabled switching means of an indication, generated in accordance with that facility as the result of that destination network termination being subsequently deemed free by that facility; and
in response to that notification of the receipt of an indication, changing the recorded current status of that destination network termination to free.

The step of notifying the CTI controller may comprise forwarding to the CTI controller the indication received at the CTI-enabled switching means.

The CTI controller may further respond to that notification of an answer condition by recording the current status of that destination directory number as busy.

A method of this first aspect may include the steps of:
providing to that facility a number for use as a destination directory number of a call to be made in accordance with that facility as the result of that destination network termination being subsequently deemed free by that facility;
notifying the CTI controller of the receipt at the CTI-enabled switching means of a said call made in accordance with that facility;
in response to that notification of the receipt of a said call made in accordance with that facility, recording the current status of that destination network termination as free.

There may be included the further step of responding to that notification of the receipt of a said call by sending from the CTI controller to the CTI-enabled switching means a command for cancelling that call back when free facility in respect of that destination directory number.

The step of responding to receipt of a call terminating at the CTI-enabled switching means may comprise:
extending that terminating call to the CTI controller via a first channel of a transmission link; determining said destination network termination;
making an originating call to that destination directory number from the CTI controller via a second channel of the transmission link; and
joining the terminating call and the originating call at the CTI controller.

According to a first aspect of the present invention there is provided a computer telephony integration (CTI) system comprising a CTI-enabled switching means, and an associated CTI controller coupled to the CTI-enabled switching means via a CTI signalling link:
the CTI-enabled switching means being arranged
to respond to receipt of a call terminating at the CTI-enabled switching means by
delivering that terminating call to a destination network termination, and
sending to the CTI controller signalling data of that call comprising at least the directory number of that destination network termination; and
to notify the CTI controller of an answer condition with respect to that destination network termination; and,
the CTI controller being arranged to respond to that notification, by sending to the CTI-enabled switching means a command for invoking a call back when free facility in respect of that destination directory number.

The CTI-enabled switching means may be further arranged to notify the CTI controller of the receipt at the CTI-enabled switching means of an indication, generated in accordance with that facility as the result of that destination network termination being subsequently deemed free by that facility; and
the CTI controller may be further arranged to respond to that notification of the receipt of an indication by changing the recorded current status of that destination network termination to free.

The CTI-enabled switching means may be arranged to forward to the CTI controller the indication received at the CTI-enabled switching means.

The CTI controller may be further arranged to respond to that notification of an answer condition by recording the current status of that destination directory number as busy.

There may be included means for providing to that facility a number for use as a destination directory number of a call to be made in accordance with that facility as the result of that destination network termination being subsequently deemed free by that facility; and the CTI-enabled switching means may be arranged to notify the CTI controller of the receipt at the CTI-enabled switching means of a said call made in accordance with that facility; and the CTI controller may be arranged to respond to that notification of the receipt of a said call made in accordance with that facility by recording the current status of that destination network termination as free.

Preferably, the CTI controller is further arranged to respond to that notification of the receipt of a said call by sending to the CTI-enabled switching means a command for cancelling that call back when free facility in respect of that destination directory number.

The CTI-enabled switching means may be arranged to respond to receipt of the terminating call by extending that terminating call to the CTI controller via a first channel of a transmission link; and the CTI controller may be arranged to determine said destination network termination, to make an originating call to that destination directory number from the CTI controller via a second channel of the transmission link, and to join the terminating call and the originating call at the CTI controller.

BRIEF DESCRIPTION OF THE DRAWINGS

Specific embodiments of the present invention will now be described by way of example with reference to the drawings, in which.

DETAILED DESCRIPTION OF EXEMPLARY NON-LIMITING EMBODIMENTS

Figure 1:
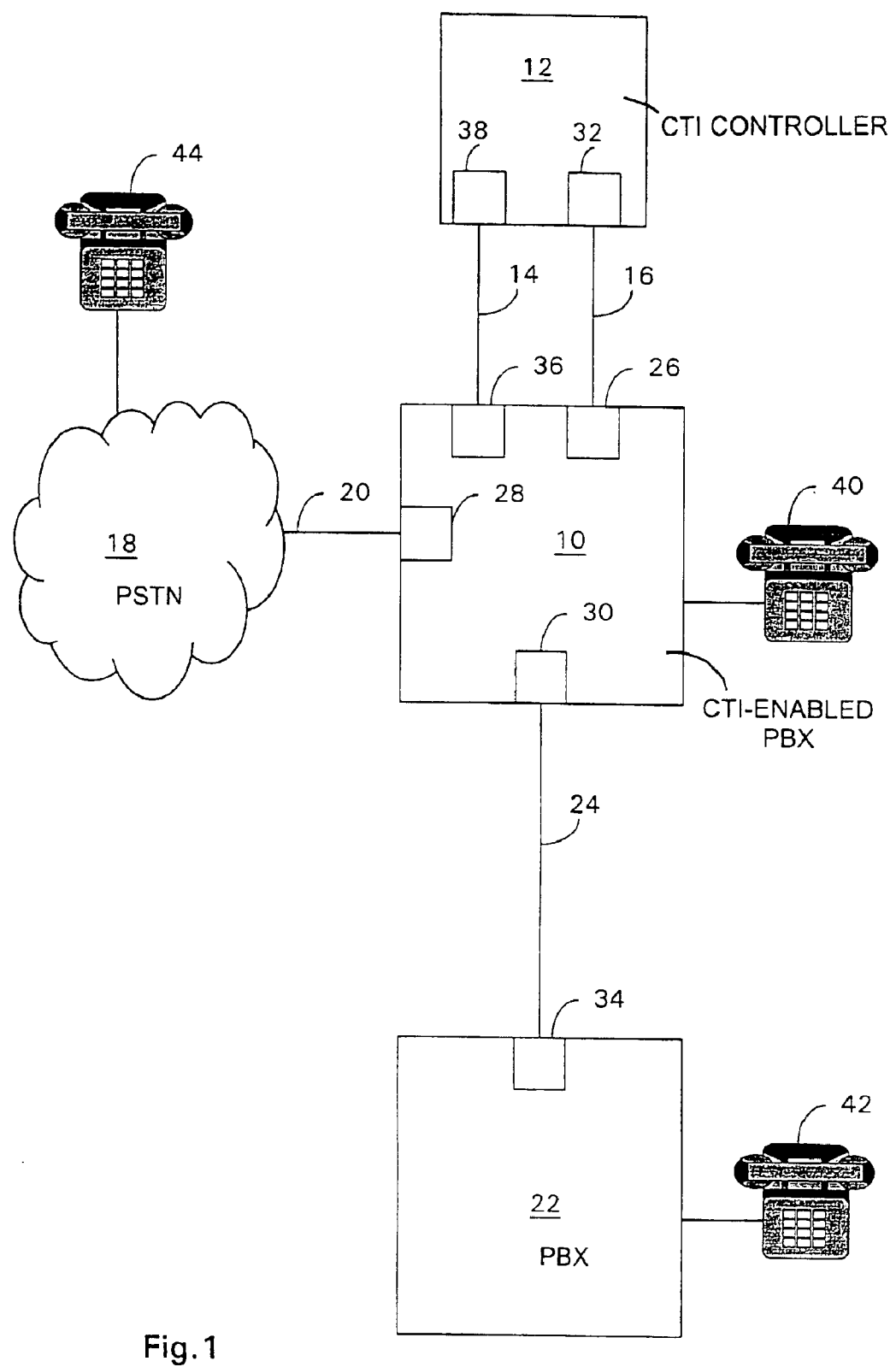
FIG. 1 shows a first embodiment of a system of the present invention.

Acronyns used in the following description.
BT British Telecommunications public limited company
CBWF Call Back When Free
CLC Calling-Called Line Category
CLI Calling Line Identity
CTI Computer Telephony Integration
DA destination address
DN directory number
DNIS Dialled Number Identification Service number
ISRM Initial Service Request Message
OLI Originating Line Identity
PBX Private Branch Exchange
PCM Pulse Code Modulation
PSTN Public Switched Telephone Network
SIC Service Indicator Code In FIG. 1 there is shown a first embodiment of a CTI system comprising a CTI-enabled PBX 10 connected to its associated CTI controller 12, also called a CTI server, via a CTI link 14 and a 2.048 Mbit/s 32-channel PCM transmission link 16. The CTI-enabled PBX 10 is also connected to a PSTN 18 via a 2.048 Mbit/s 32-channel PCM transmission link 20, and to a PBX 22 via a 2.048 Mbit/s 32-channel PCM transmission link 24.

The transmission links 16, 20 and 24 are each terminated at the CTI-enabled PBX 10 by respective primary rate cards 26, 28 and 30; the transmission link 16 is terminated at the CTI controller 12 by a primary rate card 32; and the transmission link 24 is terminated at the PBX 22 by a primary rate card 34. The CTI-enabled PBX 10 and the PBX 22 are enabled to send and receive signalling messages via the transmission link 24 using a signalling system known in the art as Digital Private Network Signalling System No.1 (DPNSS1) and described in the document BTNR 188 available from BT.

The CTI link 14 is terminated at the CTI-enabled PBX 10 by a CTI interface card 36 and at the CTI controller 12 by a CTI interface card 38. The CTI interface cards 36 and 38 operate in accordance with a CTI protocol known as Computer Supported Telecommunications Applications (CSTA). There are a number of proprietary CTI protocols, e.g. Meridian Link from Northern Telecom, and several "open", or proposed standard, CTI protocols, including CSTA, but the performance of the present invention is not dependent upon the use of any particular CTI protocol.

The CTI-enabled PBX 10 and the PBX 22 are both connected to a respective plurality of telephones, also referred to as extensions, corresponding to ONs within their respective numbering ranges, of which, for convenience, only one telephone 40 is shown connected to the CTI-enabled PBX 10, and only one telephone 42 is shown connected to the PBX 22. Herein, telephones are also referred to as network terminations.

The operation of the CTI-enabled PBX 10 and its associated CTI controller 12 will now be described with reference to a call made from a user A having a telephone 44 connected via a local exchange (not shown) to the PSTN 18, to a user B associated with the telephone 40.

In this embodiment the CTI controller 12 is responsible for determining where the call is delivered. Therefore, on receipt of the call via the transmission link 20, the CTI-enabled PBX 10 will first send the signalling data, i.e. the CLI and the DNIS, of that call to the CTI controller 12 and await a delivery instruction. Assuming firstly that user B wants incoming calls delivered to his telephone 40 and has not invoked, for example, a Call Forward facility, the CTI controller 12 will respond with a delivery instruction for delivery to the telephone 40, and the CTI-enabled PBX 10 will respond by causing telephone 40 to ring.

The CTI-enabled PBX 10 is programmed to report to the CTI controller 12 the various stages of its call processing, i.e. the telephony states. Thus, when telephone 40 is caused to ring, a corresponding message is sent to the CTI controller 12 which records that the state of telephone 40 has gone from Free to Ringing. When user B answers that call, the CTI controller 12 responds to the next message, for that call, from the CTI-enabled PBX 10 by changing the recorded state from Ringing to Busy, and when user B goes on-hook at the end of that call, the CTI-enabled PBX 10 responds to the next message, for that call, from the CTI-enabled PBX 10 by changing the recorded state from Busy to Free.

The present invention enables the CTI controller 12 to maintain its call log for situations where the CTI-enabled PBX 10 has delivered the call to a remote PBX, for example the PBX 22, which, in the most likely situation, is not CTI-enabled and programmed to monitor and report on the telephony states. For the following description, the CTI-enabled PBX 10 is also referred to as the Originating PBX, and the PBX 22 is referred to as the Terminating PBX.

Before describing the present invention, it will be instructive for the reader to understand how in known CTI systems the CTI controller 12 does not know when a call delivered off-switch, i.e. sent to a Terminating PBX, goes from Busy to Free. Assume, therefore, that user B wants his calls delivered to telephone 42 in the conventional CTI system.

The CTI controller 12 will respond to the incoming call from A with a delivery instruction for delivery to the telephone 42, and the CTI-enabled PBX 10 will act as the Originating PBX and respond by sending an Initial Service Request Message (ISRM) to the Terminating PBX. The Terminating PBX will communicate with the Originating PBX by conventional Call Set Up messages in accordance with DPNSS1, and up to the time that user B answers at telephone 42, the Originating PBX has control of the call (in case there is no answer and the Originating PBX has to take alternative action) and sends appropriate messages to the CTI controller 12. Thus, when user B answers, the CTI controller 12 records that user B is Busy at telephone 42.

The Originating PBX responds to the message from the Terminating PBX indicating an answer at telephone 42 by connecting that incoming call to a transmission channel in the transmission link 24 and ceasing monitoring. In other words, the Originating PBX has no further interest in monitoring that call. Thus, when user B goes on hook and the Terminating PBX signals this to the Originating PBX, that connection will be taken down, but no message will be sent to the CTI controller 12, and the recorded state of telephone 42 (user B) will remain at Busy, although it is actually Free.

The present invention is concerned with actions after the Originating PBX has forwarded the call to the Terminating PBX, and user B has answered the call at telephone 42.

Up to this point, the CTI controller 12 receives the conventional messages from the Originating PBX, and progresses through recording the status of user B as Ringing, and subsequently as Busy. The last message of this stage is an answer message from the Terminating PBX, containing in Delivered Directory Number field the directory number to which the call has been delivered, in this case the directory number of telephone 42, i.e. its extension number, and the Originating PBX responds by sending a corresponding reporting message to the CTI controller 12.

According to the present invention, the CTI controller 12 additionally responds to receipt of this corresponding reporting message by instructing the Originating PBX to make a "Call Back When Free—Request" in respect of the directory number of that message, i.e. telephone 42.

In this embodiment, the Originating PBX responds to that instruction to initiate a CBWF request by selecting for use as an OLI an available one of a pool of "reserved" extension numbers, i.e. numbers for which there are no physical line cards and telephones; sending, by means of a Virtual Call, a corresponding message, "ISRM-CBWF: REQUEST", to the Terminating PBX; and storing that CBWF message. The Terminating PBX also stores that CBWF message, marked as waiting for telephone 42 to become free. This message has a message type field containing "ISRM(C)"; an SIC field containing "TELE"; an OLI field containing the selected number; a signalling type field containing "CLC-ORD"; a CBWF type field containing "CBWF-R"; and a destination address (DA) field containing the directory number of telephone 42.

In variants, the CTI controller 12 performs the selection of the "reserved" number to be used as the OLI, and passes that to the Originating PBX with the instruction.

As part of the known CBWF facility, the Terminating PBX will send a Clear Request Message (CRM) having a message type field containing "CRM"; a Clearing Clause (CC) type field containing "CC: Acknowledge"; a CLI field containing the number of telephone 42; and a State of Destination (SOD) field containing "SOD B", and in response the Originating PBX will return a Clear Indication Message (CIM), which is identical to that CRM except that its message type field contains "CIM".

When user B finishes the call and puts the telephone 42 on-hook, the Terminating PBX detects this and, if telephone 42 is still free after a timeout of three seconds in which user B may make a follow on call, generates a "CALL BACK WHEN FREE—FREE NOTIFICATION" message ", which it sends to the Originating PBX. This message is similar to the "ISRM-CBWF: REQUEST", but differs in that the CLC field contains "CLC-NET" to indicate that network signalling is being used, and in that the CBWF type field contains "CBWF-FN". The Terminating PBX also blocks telephone 42.

When the Originating PBX receives this "CBWF-FN" message, it returns an Acknowledgement CRM, to which the Terminating PBX replies with an Acknowledgement CIM. The Originating PBX then proceeds to generate the next message of the CBWF sequence, namely a "CALL BACK WHEN FREE—CALL SETUP", and to send it to the Terminating PBX. This message is similar to the "ISRM-CBWF: REQUEST", but differs in that the CLC field contains "CLC-ORD" to indicate that ordinary signalling is to be used, and in that the CBWF type field contains "CBWF-CSU". The Terminating PBX is programmed to withhold ringing from the telephone 42 at this stage.

On receipt of this CBWF-CSU message, the Terminating PBX responds with a Number Acknowledge Message (NAM). As "reserved" extension numbers have no actual line cards and telephones, their SOD is permanently set to Free, so the Originating PBX will respond to receipt of that NAM by applying a calling signal to the "originating extension" for this CBWF situation, i.e. the selected extension number, and reporting to the CTI controller 12 that an incoming call had been received for the selected extension from telephone 42. The CTI controller 12 now changes the recorded state of telephone 42 from Busy to Free.

The Originating PBX will wait for a timeout of sixteen seconds, cancel the stored CBWF request message, and send a CRM containing "CC-REJECT", causing the stored CBWF request message to be cancelled at the Terminating PBX. In variants, the CTI controller 12 further responds to receipt of that report by immediately instructing the Originating PBX to treat the timeout as having matured.

Figure 2:
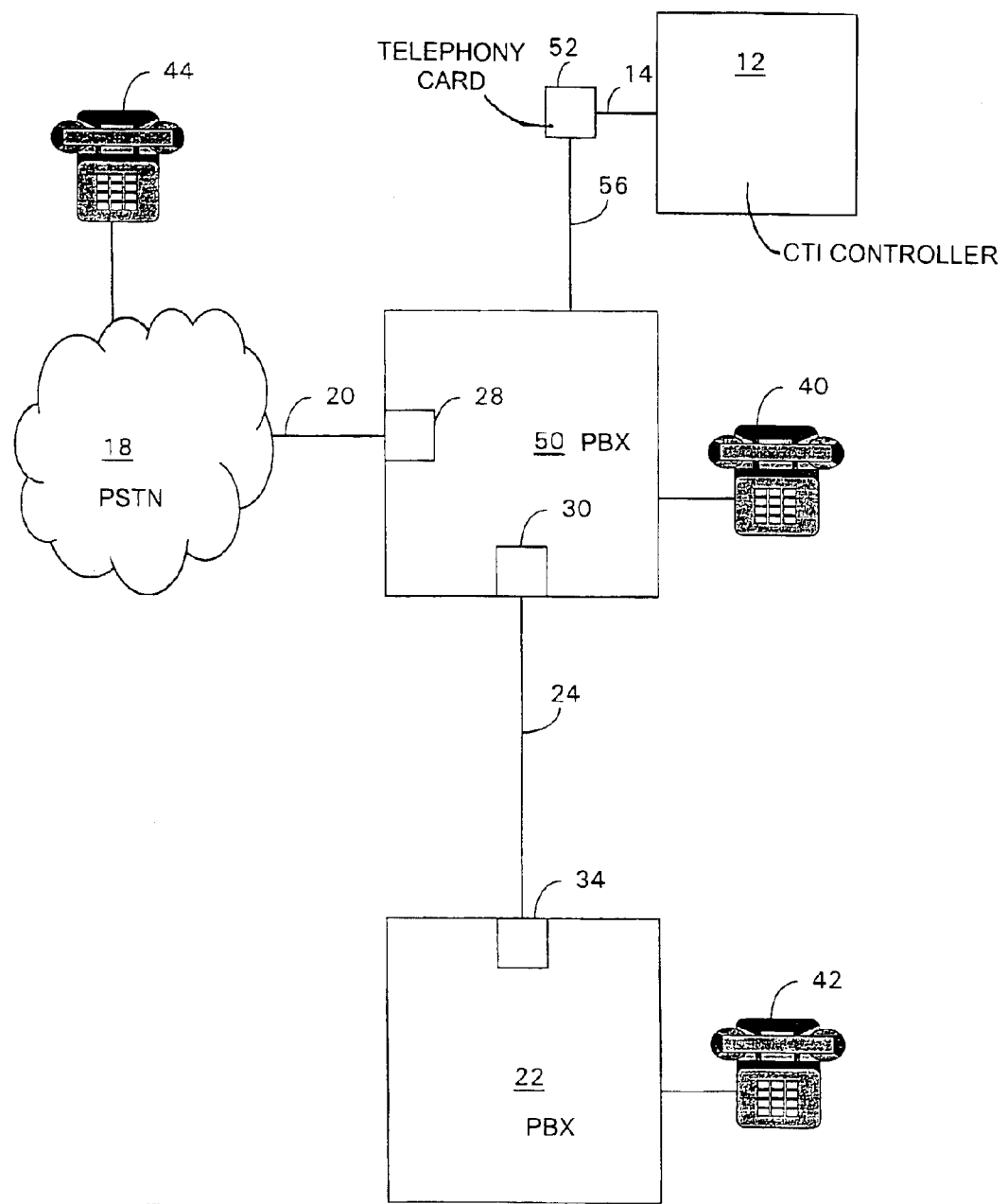
FIG. 2 shows a second embodiment of a system of the present invention.

In another embodiment of the present invention shown in FIG. 2, the CTI-enabled PBX 10 is replaced by PBX 50, which is not enabled for CTI operation, together with a telephony card 52 mounted in a computer (not shown) and coupled to the PBX 50 via a 2.048 Mbit/s 32 channel PCM transmission link 56 having primary rate interface cards (not shown) at each end. The signalling link 14 from the CTI controller 12 is connected to the telephony card 52. In this embodiment the computer and the CTI controller 12 are disposed in different locations, but in variants the CTI controller 12 is constituted by a program running on that computer. The PBX 50 and the telephony card 52 together constitute a CTI-enabled switching system of the present invention.

Upon receipt of an incoming call from network termination 44, the PBX 50 effectively terminates that call on the telephony card 52 using a first of the channels of the transmission link 56 to send a DPNSS1 signalling message to the telephony card 52 reporting the arrival of that call. The telephony card 52 sends a corresponding CSTA message via the signalling link 14 to the CTI controller 12, which determines the actual destination for that call, i.e. whether the call is to be delivered to an extension of the PBX 50 or forwarded to an extension of a remote PBX, for example the PBX 22.

In this embodiment, because the PBX 50 is not enabled for direct CTI control, the CTI controller 12 originates a call from the telephony card 52 to the actual destination using a second channel of the transmission link 56, and, upon receiving notification of answer at the destination telephone, commands the telephony card 52 to connect the first and second channels, and records the state of that destination extension as Busy. The PBX 50 detects, in known manner, that the incoming call from network termination 44 is now extended out to a remote PBX and performs route optimisation to connect the incoming call directly to that outgoing call, and to drop the "tromboned" section to and from the telephony card 52. The CTI controller 12 has thus lost its direct visibility of that call.

In similar manner to the first embodiment, the CTI controller 12 sends via the CSTA signalling link 14 an instruction to initiate a CBWF-REQUEST. The telephony card 52 responds by selecting a "reserved" extension number for use as the OLI and sending an "ISRM-CBWF: REQUEST" message to the PBX 50, which stores that message and sends it on to the remote PBX, as described above.

When the destination extension becomes free, the remote PBX will send a "CALL BACK WHEN FREE—FREE NOTIFICATION" message to the PBX 50, which responds by sending a call setup message (CBWF-CSU) to the remote PBX.

The remote PBX makes a call to that "reserved" extension number, which will be received at the telephony card 52, and its arrival reported to the CTI controller 12. The CTI controller 12 will change the recorded state of the original call from Busy to Free, and instruct the PBX 50 to cancel the CBWF-REQUEST. The PBX 50 cancels its stored request, and sends to the remote PBX a CRM containing "CC-REJECT", causing the corresponding stored CBWF request message to be cancelled at the remote PBX.

Figure 3:
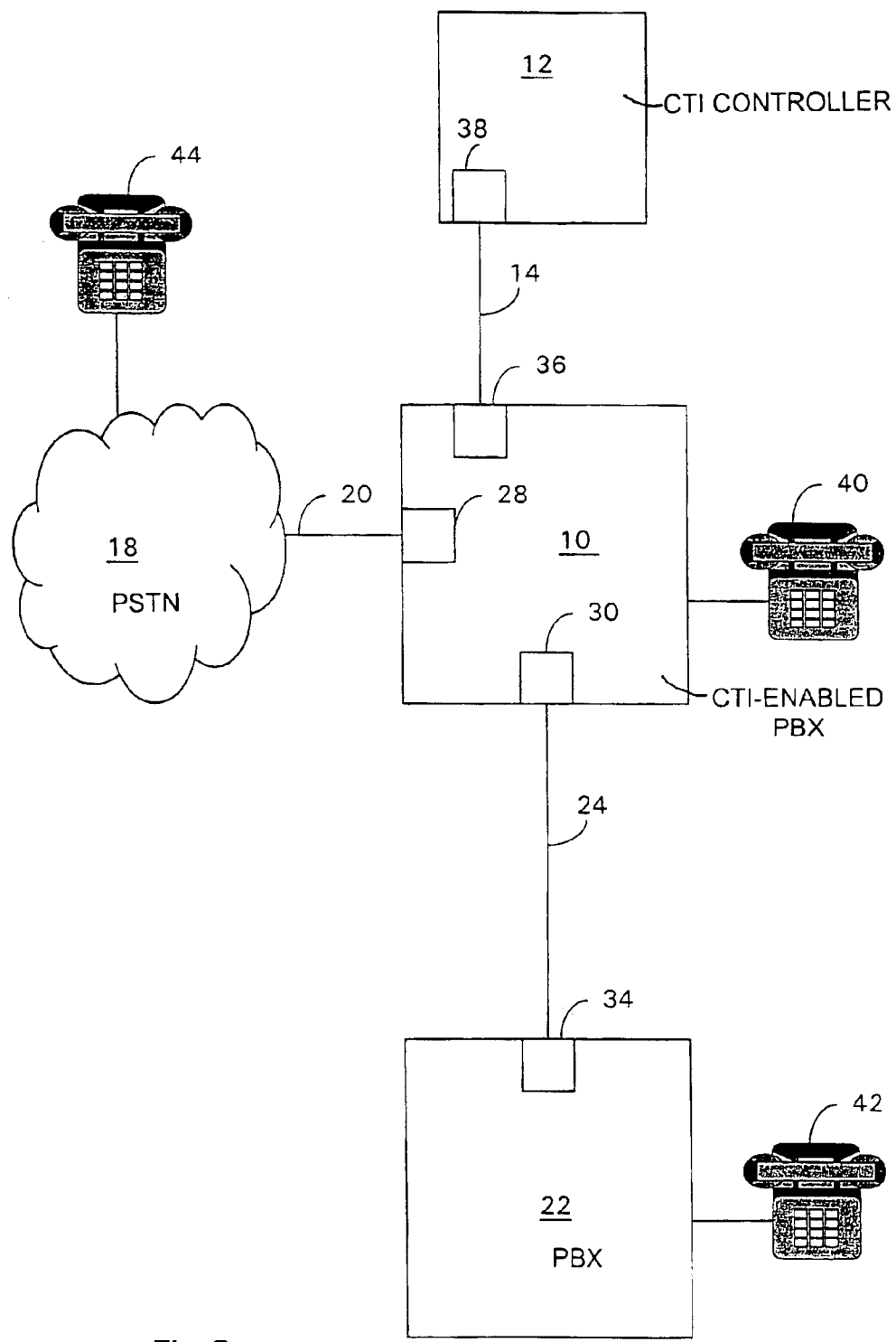
FIG. 3 shows a third embodiment of a system of the present invention.

In FIG. 3 there is shown a further embodiment of a CTI system similar to the embodiment of FIG. 1 but differing in that the transmission link 16 is omitted and in that the CTI-enabled PBX 10' (Originating PBX) of this embodiment has a modified control program.

The operation of the Originating PBX and its associated CTI controller 12 will now be described with reference to a call made from the user A to the user B associated with the telephone 40.

As in the first embodiment, the Originating PBX will first send the signalling data, i.e. the CLI and the DNIS, of that call to the CTI controller 12, and await a delivery instruction.

In the case that user B wants incoming calls forwarded to the telephone 42, the CTI controller 12 will provide the delivery instruction for delivery to the telephone 42, and, in response to being notified of the subsequent receipt of the answer message at the Originating PBX, will issue the instruction to initiate a CBWF request. The CTI controller 12 will have recorded, as before, the telephony status of the telephone 42, identified by its directory number, as now being Busy.

The Originating PBX of this embodiment is arranged to respond to instructions from the CTI controller 12 to initiate CBWF requests by sending, by means of a Virtual Call, the corresponding message, "ISRM-CBWF: REQUEST", to the Terminating PBX; and storing that CBWF request message. In the normal manner, the Terminating PBX also stores that CBWF request message, marked as waiting for telephone 42 to become free. The OLI field of this "ISRM-CBWF: REQUEST" contains all null characters since, as is described in detail below, the CBWF facility, as invoked by the CTI controller 12 for the purposes of the present invention, does not progress to the "CALL SET-UP" stage. On receipt of this request message, the Terminating PBX does not examine the OLI field, and its operation is not affected by the null characters.

As part of the known CBWF facility, the Terminating PBX will send a Clear Request Message (CRM) having a message type field containing "CRM"; a Clearing Clause (CC) type field containing "CC: Acknowledge"; a CLI field containing the number of telephone 42; and a State of Destination (SOD) field containing "SOD B", and in response the Originating PBX will return a Clear Indication Message (CIM), which is identical to that CRM except that its message type field contains "CIM".

When user B finishes the call and puts the telephone 42 on-hook, the Terminating PBX detects this and, if telephone 42 is still free after a timeout of three seconds in which user B may make a follow on call, generates the "CALL BACK WHEN FREE—FREE NOTIFICATION" message ", which it sends to the Originating PBX.

When the Originating PBX receives this "CBWF-FN" message, it notifies the CTI controller 12 of that receipt by forwarding that message to the CTI controller 12, and the CTI controller 12 responds by changing the recorded telephony state of the telephone 42 from Busy to Free. In a variant, the Originating PBX sends instead a corresponding "FREE NOTIFICATION" message to the CTI controller 12 in respect of the directory number of the telephone 42, i.e. the contents of the DA field of the received message.

The Originating PBX also cancels the stored CBWF request message for that directory number, and sends to the Terminating PBX a CRM containing "CC REJECT", causing the corresponding stored CBWF request message to be cancelled at the Terminating PBX. In a variant, the Originating PBX cancels the stored CBWF request message for that directory number in response to a command from the CTI controller 12.

The principle of operation of this further embodiment is applicable to the above arrangement of the combination of the PBX 50, which is not enabled for CTI operation, together with the telephony card 52.

Whereas the specific embodiments described above are based on a switch in the form of a PBX, it will be appreciated that the present invention embraces other forms of switching function. For example, the switch can be a public network switch, such as a Nortel DMS100 switch which is used in known CTI arrangements in conjunction with a CompuCall CTI controller; and other forms of switching function include switches known as Automatic Call Distributor (ACD), Interactive Voice Response (IVR), and server PBX. Furthermore, the type of switching is not limited to any one form, and, in addition to switched circuit technology, includes Asynchronous Transfer Mode (ATM) switching, and Voice over Internet Protocol (VoIP) switching. With regard to this last form of switching, the switch can be a PBX having an Internet Card, or it can be a general purpose computer, e.g. one running Windows NT, having an Internet card, e.g. a Dialogic Internet card, and in this latter case the CTI controller function is provided by a program running in the computer, rather than in a separate controller. Furthermore, the telephones at the workstations can connect to their respective clients via Internet phone jacks, and in an alternative arrangement telephony can be provided for the user via a sound card in his client.

Thus, it can be seen that in general the present invention can be implemented in any computer controlled switch, by means of a suitable controlling program.

In the above specific embodiments, the called user is an individual person who normally works at a workstation. It will be appreciated that a DNIS need not correspond to an individual person, but may relate to a department or group, or a specific function within a company. Furthermore, more than one DNIS can correspond to such a function.

Similarly, the present invention includes caller identities other than the abovementioned CLI. These include a cell identity when the caller is using a mobile telephone, an alphanumeric string, an Internet Protocol address, and "null" information, e.g. where a caller has withheld his CLI.

It will also be appreciated that the term CTI, although originating from the computer control of voice telephony, is not limited to voice communications and includes other types of communications, e.g. videotelephony, and multimedia.

In the above described specific embodiments, the CTI server controller 12 sends a message to the computer for each of the store 48 members. In this way, the called user will get a screen pop including a "caller identity", i.e. details of the caller, immediately or after a defined time. The caller identity being typically the CLI (or a null identity if CLI is withheld) or equivalent, and any translation to a name for the caller (or Unknown if no translation is found). Each active computer, other than the called user, receives the message, but does not display the caller identity until the workgroup member clicks on the called user's icon. In a variant, only the called user is sent a message including the caller identity, and the other active computers receive a message containing only the called user identity. In this case, when a workgroup member clicks on the called user's icon, a request is sent from his computer to the CTI controller 12 for a return message containing the caller identity.

Furthermore, whereas the abovedescribed specific embodiments are third party CTI arrangements, the skilled person will appreciate that the present invention is also applicable to first party CTI arrangements.

Unless the context clearly requires otherwise, throughout the description and the claims, the words "comprise", "comprising" and the like are to be construed in an inclusive as opposed to an exclusive or exhaustive sense; that is to say, in the sense of "including, but not limited to".

What is claimed is:

1. A method of operating a computer telephony integration (CTI) system comprising a CTI-enabled switch, and an associated CTI controller coupled to the CTI-enabled switch via a CTI signalling link, the method enabling the CTI controller to maintain a call log of the CTI controller when a call is delivered off-switch by said CTI-enabled switch, the method comprising the steps of:
    responding to receipt of a call terminating at the CTI-enabled switch, the call being initially directed to an on-switch destination network termination, by:
        delivering the received call initially directed to the on-switch destination network termination from the CTI-enabled switch to an off-switch destination network termination, and
        sending to the CTI controller signalling data of the call comprising at least a directory number of the off-switch destination network termination;
    notifying the CTI controller of an answer condition with respect to the off-switch destination network termination; and
    in response to notifying the CTI controller, sending from the CTI controller to the CTI-enabled switch a command for invoking a call back when free facility in respect of the directory number of the off-switch destination network termination, wherein responses to said command received by said CTI-enabled switch in respect of said off-switch destination network termination enable the CTI controller to determine when the call is delivered off-switch via a remote switch and to update a telephony state of said off-switch destination network termination in the call log.

2. A method as in claim 1, wherein said off-switch destination network termination is connected to said CTI system via the remote switch and wherein the remote switch is not CTI-enabled.

3. A method as in claim 1, wherein the CTI-enabled switch is the CTI-enabled switch of the on-switch destination network termination to which said call is initially directed, and said off-switch destination network termination is a forwarded destination network termination determined by a user of said on-switch destination network termination.

4. A method as in claim 1, wherein said response to said command includes the steps of:
    further responding at the CTI controller to the notification of an answer condition by notifying the CTI controller of the receipt at the CTI-enabled switch of an indication, generated in accordance with the facility as the result of the off-switch destination network termination being subsequently deemed free by the facility; and
    in response to that notification of the receipt of an indication, updating the telephony state of said off-switch destination network termination in the call log by changing a recorded current status of the off-switch destination network termination to free.

5. A method as in claim 4, wherein the step of notifying the CTI controller comprises forwarding to the CTI controller the indication received at the CTI-enabled switch.

6. A method as in claim 1, wherein the CTI controller further responds to the notification of an answer condition by recording a current status of the directory number of the off-switch destination network termination in the call log as busy.

7. A method as in claim 1 further comprising the steps of:
    providing to the facility a number for use as a destination directory number of a call to be made in accordance with the facility as the result of the off-switch destination network termination being subsequently deemed free by the facility;
    notifying the CTI controller of the receipt at the CTI-enabled switch of said call made in accordance with the facility;
    in response to the notification of the receipt of said call made in accordance with said facility, recording a current status of the off-switch destination network termination is the call log as free.

8. A method as in claim 7 further comprising the step of responding to the notification of the receipt of said call by sending from the CTI controller to the CTI-enabled switch a command for cancelling the call back when free facility in respect of the off-switch destination directory number.

9. A method as in claim 6, wherein the step of responding to receipt of the call terminating at the CTI-enabled switch comprises:
    extending the terminating call to the CTI controller via a first channel of a transmission link;
        determining said off-switch destination network termination;
        making an originating call to the destination directory number from the CTI controller via a second channel of the transmission link; and joining the terminating call and the originating call at the CTI controller.

10. A computer telephony integration (CTI) system comprising:

a CTI-enabled switch; and an associated CTI controller coupled to the CTI-enabled switch via a CTI signalling link:

the CTI-enabled switch being arranged:

to respond to receipt of a call terminating at the CTI-enabled switch, the call being initially directed to an on-switch destination network termination, by:

delivering the received call which is initially directed to the on-switch destination network and terminates at the CTI-enabled switch from the CTI-enabled switch to an off-switch destination network termination, and sending to the CTI controller signalling data of the call comprising at least a directory number of the off-switch destination network termination; and to notify the CTI controller of an answer condition with respect to the off-switch destination network termination; and the CTI controller being arranged to respond to the notification of the answer condition by sending to the CTI-enabled switch a command for invoking a call back when free facility in respect of the directory number of the off-switch destination network termination, wherein responses to said command received by said CTI-enabled switch in respect of said off-switch destination network termination enable the CTI controller to determine when the call is delivered off-switch via a remote switch and to update a telephony state of said off-switch destination network termination.

11. A system as in claim 10, wherein the CTI-enabled switch is further arranged to notify the CTI controller of the receipt at the CTI-enabled switch of an indication generated in accordance with the facility as the result of the off-switch destination network termination being subsequently deemed free by the facility; and the CTI controller is further arranged to respond to the notification of the receipt of an indication by changing a recorded current status of the off-switch destination network termination to free.

12. A system as in claim 10, wherein the CTI-enabled switch is arranged to forward to the CTI controller the indication received at the CTI-enabled switch.

13. A system as in claim 10, wherein the CTI controller is further arranged to respond to the notification of an answer condition by recording a current status of the off-switch destination directory number as busy.

14. A system as in claim 10, wherein the facility is provided a number for use as an off-switch destination directory number of a call to be made in accordance with the facility as the result of the off-switch destination network termination being subsequently deemed free by the facility; and the CTI-enabled switch is arranged to notify the CTI controller of the receipt at the CTI-enabled switch of a call made in accordance with the facility; and the CTI controller is arranged to respond to the notification of the receipt of said call made in accordance with the facility by recording a current status of the off-switch destination network termination as free.

15. A system as in claim 13, wherein the CTI controller is further arranged to respond to the notification of the receipt of said call by sending to the CTI-enabled switch a command for cancelling the call back when free facility in respect of the off-switch destination directory number.

16. A system as in claim 13, wherein the CTI-enabled switch is arranged to respond to receipt of the terminating call by extending the terminating call to the CTI controller via a first channel of a transmission link; and the CTI controller is arranged to determine said destination network termination, to make an originating call to the off-switch destination directory number from the CTI controller via a second channel of the transmission link, and to join the terminating call and the originating call at the CTI controller.

17. A system as in claim 10, wherein the remote switch is not CTI-enabled.

18. A system as in claim 10, wherein the call initially directed to the on-switch destination network termination is delivered to the off-switch destination network termination as determined by instructions of a user of the on-switch destination network termination.

* * * * *